United States Patent [19]

Haga et al.

[11] Patent Number: 4,577,660

[45] Date of Patent: Mar. 25, 1986

[54] ROTARY SERVOVALVE

[75] Inventors: Kyosuke Haga, Anjoh; Tsuneo Tanaka, Okazaki, both of Japan

[73] Assignee: Toyoda Koki Kabushiki Kaisha, Kariya, Japan

[21] Appl. No.: 627,097

[22] Filed: Jul. 2, 1984

[30] Foreign Application Priority Data

Jul. 4, 1983 [JP] Japan .................................. 58-121410

[51] Int. Cl.$^4$ .................. F15B 9/10; F62D 5/083; F16K 11/083

[52] U.S. Cl. .................. 137/625.24; 137/625.21; 137/625.32; 91/375 A; 180/148

[58] Field of Search ............... 137/625.21, 625.22, 137/625.23, 625.24, 596, 596.1, 625.3, 625.31, 625.32; 91/375 R, 375 A, 374, 372, 467; 180/132, 133, 148

[56] References Cited

U.S. PATENT DOCUMENTS

| 4,310,024 | 1/1982 | Bacardit | 137/625.21 |
|---|---|---|---|
| 4,335,745 | 6/1982 | Bouveret et al. | 137/625.22 |
| 4,335,749 | 6/1982 | Walter | 137/625.22 |
| 4,353,288 | 10/1982 | Holub | 91/467 X |
| 4,452,274 | 6/1984 | Haga et al. | 91/375 A X |
| 4,460,016 | 7/1984 | Haga et al. | 91/375 A X |
| 4,465,098 | 8/1984 | Bacardit | 137/625.21 |

Primary Examiner—Martin P. Schwadron
Assistant Examiner—John S. Starsiak, Jr.
Attorney, Agent, or Firm—Oblon, Fisher, Spivak, McClelland & Maier

[57] ABSTRACT

A rotary servovalve includes a valve sleeve and a rotor relatively rotatably fitted therein, and includes a pressure control section composed of lands angularly spaced from each other when the servovalve is in a neutral condition and a pressure characteristic adjusting section composed of lands disposed in overlapping relation to each other when the servovalve is in the neutral condition. The lands of the pressure control section have first chamfers for gradually reducing the area of communication between fluid supply and discharge passages as the valve sleeve and the rotor are relatively turned, and the lands of the pressure characteristic adjusting section have second and third chamfers for gradually increasing and then gradually reducing the area of communication between the fluid supply and discharge passages as the valve sleeve and the rotor are relatively turned. The second and third chamfers, and the first chamfers are effectively combined for pressure control to provide desired valving characteristics.

8 Claims, 6 Drawing Figures

ROTARY SERVOVALVE

BACKGROUND OF THE INVENTION

1. Field of the Invention

The present invention relates to a rotary servovalve for use in a power steering device.

2. Description of the Prior Art

Rotary servovalves for use in power steering devices are required to have two-step valving characteristics as shown in FIG. 6 of the accompanying drawings. According to the two-step valving characteristic curve, as a steering wheel is turned, the steering wheel is not hydraulically power-assisted in a region when a steering wheel torque $T_M$ is small, is gradually hydraulically power-assisted when the steering wheel torque $T_M$ exceeds a point a, and is increasingly hydraulically power-assisted when the steering wheel torque $T_M$ is further increased beyond a point b. Therefore, the steering wheel is hydraulically power-assisted in two steps.

To gain the above two-step valving characteristics, the conventional rotary servovalve includes a valve land which generally has a small chamfer. In most of prior rotary servovalves, such a chamfer is of a simply inclined shape for practical machining reasons. With the prior chamfer configuration, however, there is a limitation on the selectibility of valving characteristics in the hydraulically power-assisted regions, and hence it is difficult to provide various steering characteristics to meet different kinds or grades of vehicles. Particularly, the simply inclined chamfer fails to give a clear characteristic change at the intersection between the first and second power-assisted regions in the two-step valving characteristics.

SUMMARY OF THE INVENTION

It is a principal object of the present invention to provide a rotary servovalve including valve lands having edge chamfers coacting in different combinations for increasing the selectibility of valving characteristics to meet various steering characteristics.

Another object of the present invention is to provide a rotary servovalve including a valve land having a plurality of types of chamfers which effectively influence fluid control characteristics.

To achieve the above object, a rotary servovalve according to the present invention has a valve sleeve and a rotor relatively rotatably fitted therein, and includes a pressure control section composed of lands angularly spaced from each other when the servovalve is in a neutral condition and a pressure characteristic adjusting section composed of lands disposed in overlapping relation to each other when the servovalve is in the neutral condition. The lands of the pressure control section have first chamfers for gradually reducing the area of communication between fluid supply and discharge passages as the valve sleeve and the rotor are relatively turned, and the lands of the pressure characteristic adjusting section have second and third chamfers for gradually increasing and then gradually reducing the area of communication between the fluid supply and discharge passages as the valve sleeve and the rotor are relatively turned. The second and third chamfers, and the first chamfers are effectively combined for pressure control to provide desired valving chararacteristics. Furthermore, the second chamfers are narrower than the first chamfers, but wider than the third chamfers in the direction of rotation of said rotor. This gives the rotary servovalve two-step valving characteristics suitable for a power steering device.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
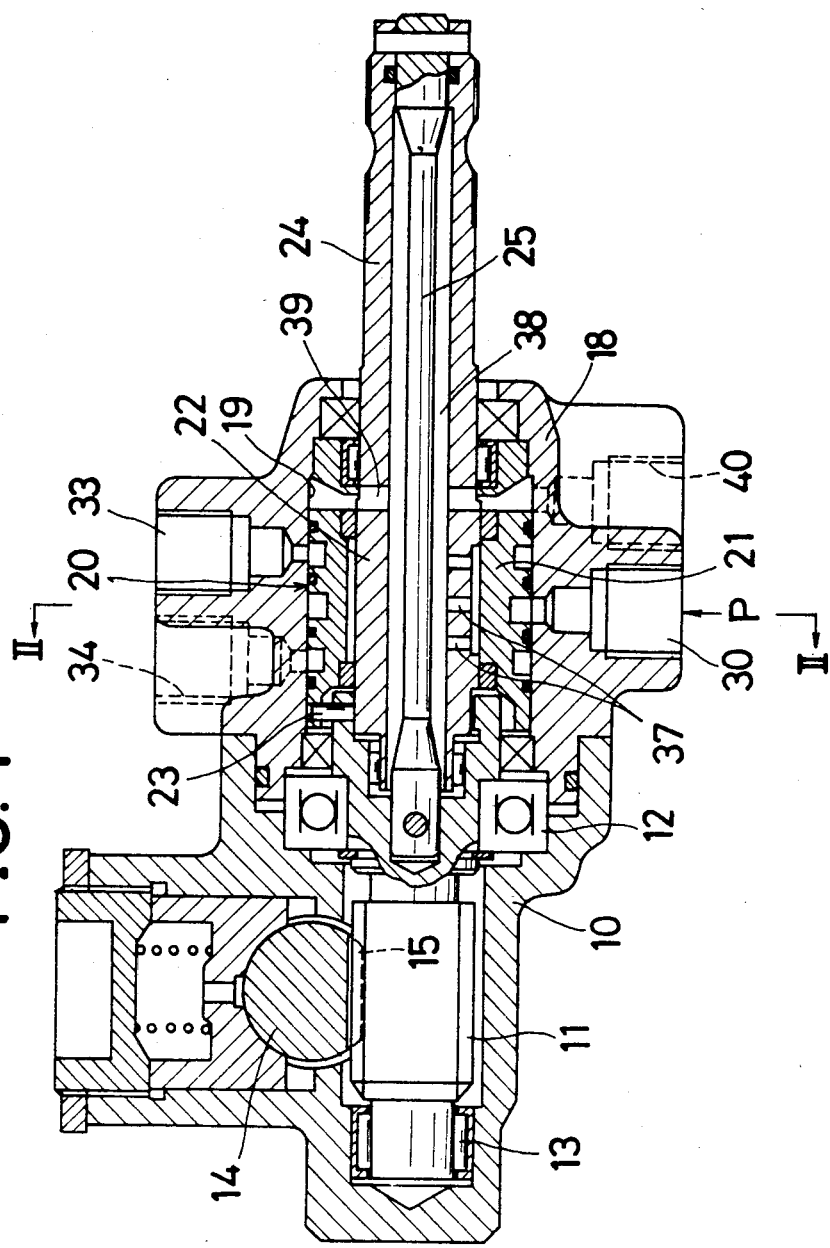
FIG. 1 is a cross-sectional view of a power steering device incorporating therein a rotary servovalve according to the present invention.

FIG. 1 shows a rack-and-pinion power steering device in which a rotary servovalve of the invention is incorporated. The power steering device has a body or gear housing 10 in which a pinion shaft 11 is rotatably supported at its ends by bearings 12, 13. The pinion shaft 11 is held in mesh with rack teeth 15 of a rack shaft 14 supported in the gear housing 10 and slidable in a direction normal to the pinion shaft 11. The rack shaft 14 has ends coupled to steerable wheels through suitable steering link mechanisms, and is operatively coupled to a piston 17 (FIG. 2) of a power cylinder 16.

A valve housing 18 is fixed to the gear housing 10 and has a valve bore 19 accommodating therein a rotary servovalve 20 of the present invention. The rotary servovalve 20 is composed of a sleeve 21 and a rotor 22 which are relatively rotatable about the axis of the pinion shaft 11. The sleeve 21 is connected by a connector pin 23 to the pinion shaft 11. The rotor 22 has an integral steering shaft 24 for connection to a steering wheel (not shown), the steering shaft 24 being flexibly connected to the pinion shaft 11 by a torsion bar 25.

Figure 2:
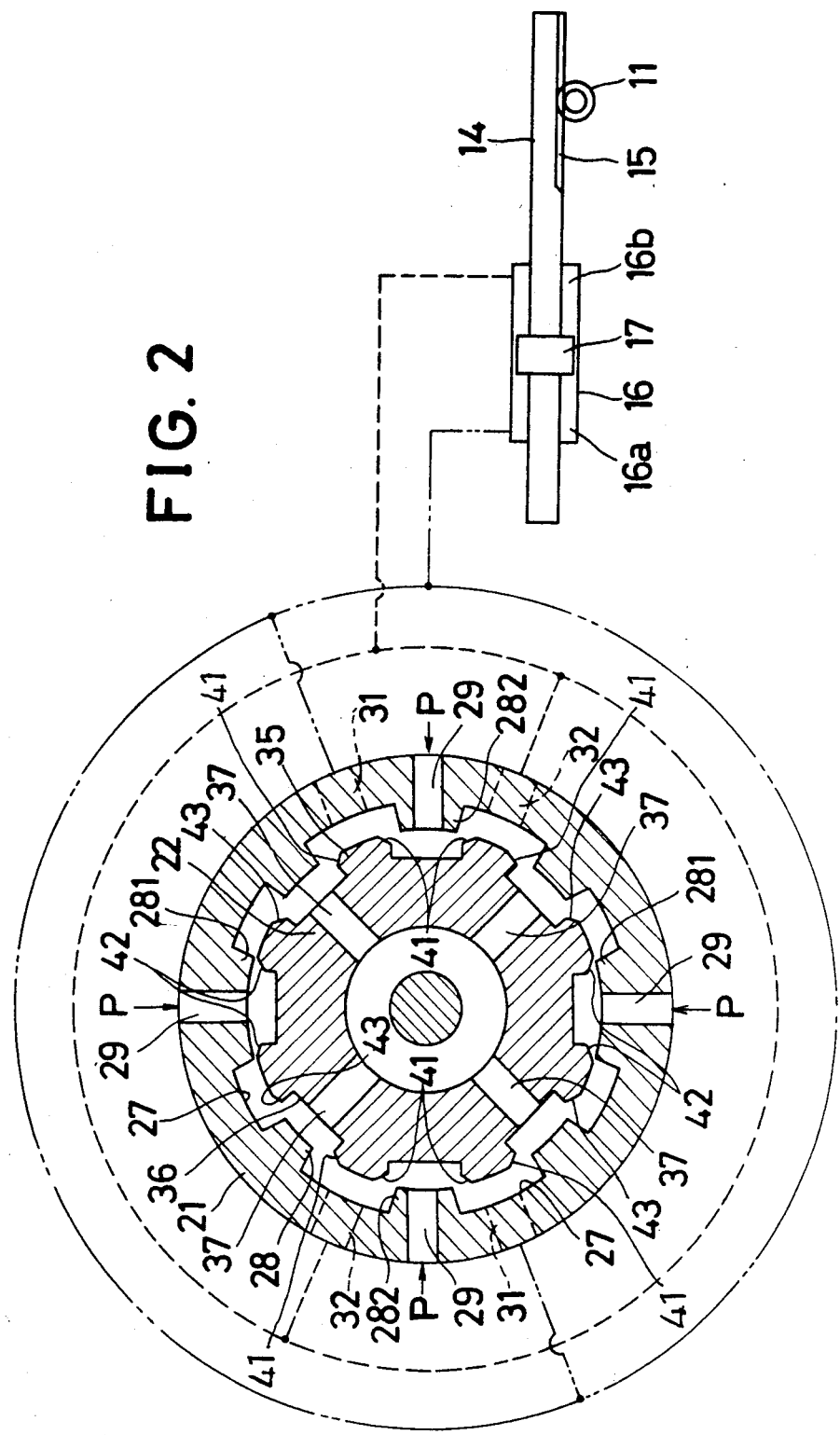
FIG. 2 is an enlarged cross-sectional view taken along line II—II of FIG. 1.

As illustrated in FIG. 2, the sleeve 21 has a plurality of (eight in the illustrated embodiment) sleeve channels or grooves 27 defined in an inner peripheral surface thereof with sleeve lands 28 formed therebetween. The rotor 22 has on its outer peripheral surface a plurality of rotor lands 35 corresponding respectively to the sleeve channels 27 with rotor channels or grooves 36 defined therebetween. Every other sleeve land 28 has a supply hole 29 communicating with a supply port 30 leading to a supply pump (not shown). One diametrically opposite pair of the sleeve lands 28 having the respective supply holes 29 are referred to as "characteristic adjusting lands 281" and have a larger width overlapping two adjacent rotor lands 22. The remaining diametrically opposite pair of the sleeve lands 28 having the respective supply holes 28 are referred to as "pressure control lands 282" and the other sleeve lands 28 are angularly spaced from the rotor lands 35. A pair of distribution holes 31, 32 open into the sleeve channels 27 disposed adjacent to each of the pressure control lands 282 on opposite sides thereof. The distribution holes 31, 32 communicate with supply and discharge ports 33, 34, respectively, leading to chambers 16a, 16b in the power cylinder 16. A discharge hole 37 opens into every other rotor channel 36 disposed on one side of each of the distribution holes. The discharge holes 37 are held in communication with a reservoir (not shown) through a passage 38 and a through hole 39 defined between the rotor 22 and the torsion bar 25, and a discharge port 40, as shown in FIG. 1. The discharge holes 37 are arranged in a plurality of rows in the axial direction of the rotor 22 to provide a desired fluid passage area without having to increase the outside diameter of the rotor 22.

The positional relationship of the lands 28, 35 of the sleeve 21 and the rotor 22, and chamfers on the lands 35 will be described with reference to FIGS. 3 and 4. The positional relationship of the lands 28, 35 will hereinafter be described with particular reference to a condition in which the sleeve 21 and the rotor 22 are in the neutral position. The maximum angular displacement of the valve will be indicated by $\theta 1$.

Figure 4:
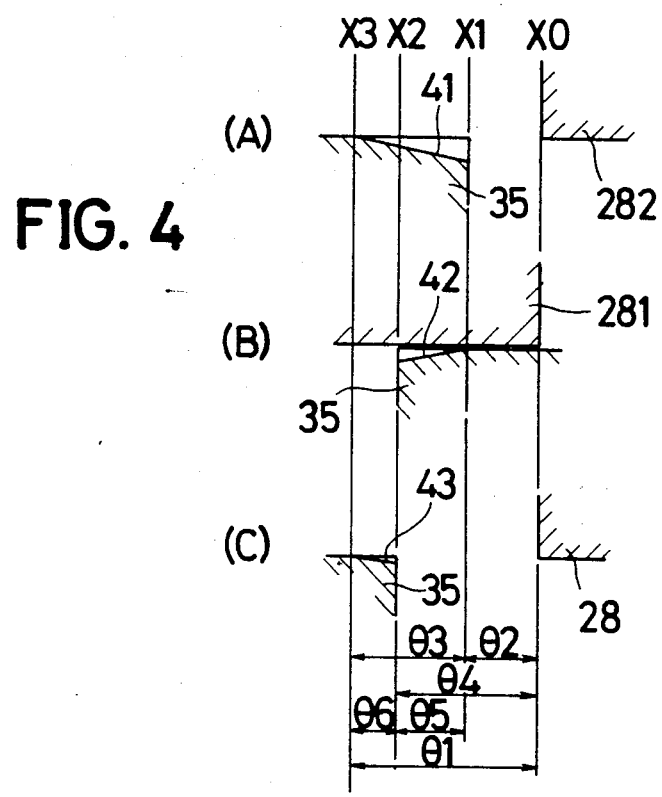
FIG. 4 is an enlarged cross-sectional view of a portion of FIG. 3.

The two rotor lands 35 disposed one on each side of each of the pressure control lands 282 are angularly spaced from the pressure control land 282 and the lands 28 one on each side thereof with an angular interval $\theta 2$ therebetween, as shown in FIG. 4 at (A). Each such rotor land 35 has on opposite edges first gradually inclined chamfers 41 extending over an angular interval of $\theta 3$ ($\theta 3 = \theta 1 - \theta 2$). The two rotor lands 35 positioned one on each side of each of the characteristic adjusting lands 281 have edges overlapping the characteristic adjusting lands 281 over an angular interval $\theta 4$ ($\theta 4 > \theta 2$) as shown in FIG. 4 at (B), the edges having second gradually inclined chamfers 42 extending over an angular interval of $\theta 5$ ($\theta 5 = \theta 4 - \theta 2$). The edges of the rotor lands 35 remote from the second chamfers 42 are angularly spaced from the lands 28 with the angular interval $\theta 4$ as shown in FIG. 4 at (C), the edges having third gradually inclined chamfers 43 extending over an angular interval of $\theta 6$ ($\theta 6 = \theta 3 - \theta 5$). The rotor lands 35 with the second and third chamfers 42, 43 have an angular width equal to that of the sleeve channels 27 disposed one on each side of each of the characteristic adjusting lands 281. When these rotor lands 35 are brought into full alignment with the respective sleeve channels 27, opening areas given by the second and third chamfers 42, 43 become substantially equal to each other.

Accordingly, the servovalve 20 has pressure control sections Z1 and pressure characteristic adjusting sections Z2 which are different in shape and arranged alternately in the circumferential direction.

Operation of the rotary servovalve 20 will be described hereunder with reference to FIGS. 3 and 4. It is to be noted that although the following description of operation is directed to one-half of the servovalve 20, the remaining one half thereof operates in the same manner as said one-half.

Figure 3:
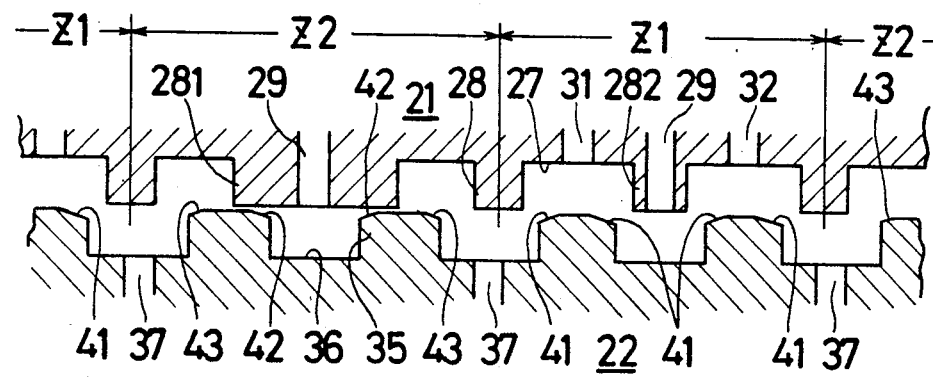
FIG. 3 is a developed view of FIG. 2.

When the rotor 22 is in the neutral condition as shown in FIGS. 3 and 4, fluid under pressure supplied to the supply port 30 flows from the supply hole 29 in the pressure control land 282 and is discharged through the two discharge holes 37, which are disposed at opposite sides of the two rotor lands 35 within the pressure control section Z1, into the discharge port 40 with no substantial resistance, so that no pressure increase is effected in the servovalve 20. Also in this neutral condition, the two rotor lands 35 within the pressure characteristic adjusting section Z2 are overlapped with the characteristic adjusting land 281. Thus, fluid supplied from the supply hole 29 in the characteristic adjusting land 281 is substantially prevented from flowing into the two discharge holes 37 which are disposed at opposite sides of the two rotor lands 35 within the characteristic adjusting section Z2.

When the steering wheel is turned to rotate the rotor 22 in, for example, a clockwise direction as viewed in FIG. 2, a first restriction area defined by the right end edge of each of the two rotor lands 35 within the pressure control section Z1 is quickly reduced in an interval ($\theta 2$) wherein the sleeve 21 is angularly moved relative to the rotor 22 from X0 and X1. On the other hand, a mating restriction area defined by the left end edge of each of the two rotor lands 35 within the section Z1 is quickly increased. Thus, fluid from the supply hole 29 in the pressure control land 282 is distributed to the right chamber 16b of the power cylinder 16 through the distribution hole 32, while fluid from the left chamber 16a of the power cylinder 16 is discharged from the distribution hole 31 to the discharge hole 37 disposed at the left of the pressure control section Z1. Due to the first chamfer 41 being formed at the right end edge of each of the rotor lands 35 within the pressure control section Z1, the rate at which the first restriction area is reduced in the interval ($\theta 3$) wherein the sleeve 21 is angularly moved relative to the rotor 22 from X1 to X3. As a result, the first restriction area varies as indicated by the solid line A1 in FIG. 5 as the angular displacement ($\theta$) of the rotor 22 changes.

In the interval ($\theta 2$) wherein the sleeve 21 is turned relative to the rotor 22 from X0 to X1, a second restriction area defined by the left end edge of the rotor land 35 which is disposed at the right side of the characteristic adjusting land 281 is maintained closed due to the rotor land 35 being overlapped with the characteristic adjusting land 281. Accordingly, fluid supplied to the supply hole 29 in the land 281 does not flow to either of the discharge holes 37 disposed at opposite sides of the characteristic adjusting section Z2. However, when the sleeve 21 is turned relative to the rotor 22 beyond X1, the second restriction area begins to open due to the second chamfer 42 being formed at the left end edge of the rotor land 35 and is progressively increased in the interval ($\theta 5$) defined between X1 and X2. Thus, fluid is discharged from the supply hole 29 to the discharge hole 37 disposed at the right side of the adjusting section Z2. Further, the second restriction area is abruptly increased beyond X2. That is, the second restriction area varies as indicated by the broken line A2 in FIG. 5 as the angular displacement ($\theta$) of the rotor 22 changes.

In the interval ($\theta 4$) wherein the sleeve 21 is turned relative to the rotor 22 from X0 and X2, a third restriction area defined by the right end edge of the rotor land 35 which is disposed at the right side of the characteristic adjusting land 281 is quickly reduced. As the sleeve 21 is further turned relative to the rotor 22 from X2 to X3 in the interval ($\theta 6$), the rate at which the third restriction area is reduced is gradually reduced due to the third chamfer 43 being formed at the right end edge of the rotor land 35 and is finally reduced to substantially zero at X3. As a consequence, the third restriction area varies as indicated by the broken line A3 in FIG. 5 as the angular displacement ($\theta$) of the rotor 22 changes. Since the second restriction area begins to open at X1 and the third restriction area is closed at X3, the discharge of fluid from the supply hole 29 to the discharge hole 37 within the characteristic adjusting section Z2 occurs only in the interval ($\theta 3$).

Figure 5:
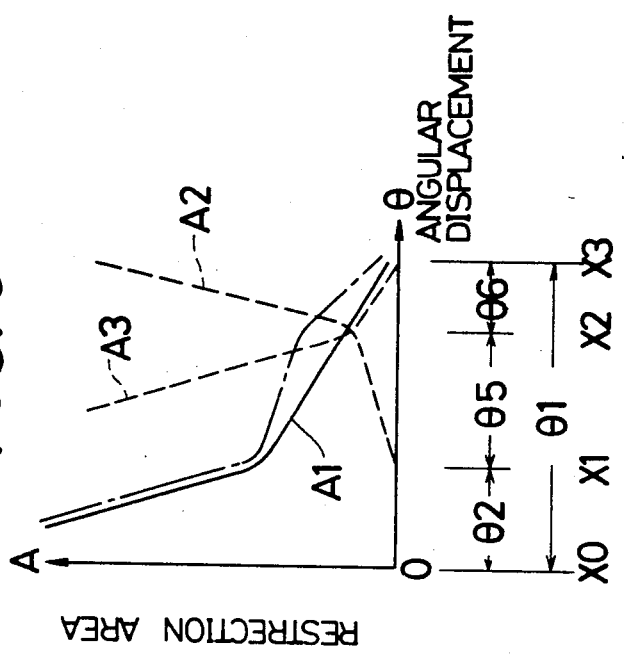
FIG. 5 is a diagram showing a restriction area plotted against an angular displacement of the valve.

The overall restriction area A in the servovalve 20 varies with the angular displacement θ as indicated by the dot-and-dash line in FIG. 5, and is a combination of the sum of the restriction areas given by the first and second chamfers 41, 42 in the interval from X1 to X2, which sum varies more gradually than the restriction area given solely by the first chamfers 41, and the sum of the restriction areas given by the first and third chamfers 41, 43 in the interval from X2 to X3, which sum varies more quickly than the restriction area given solely by the first chamfers 41. The rate at which the overall restriction area varies can freely be selected by selecting the angle of inclination of the second and third chamfers 42, 43.

Figure 6:
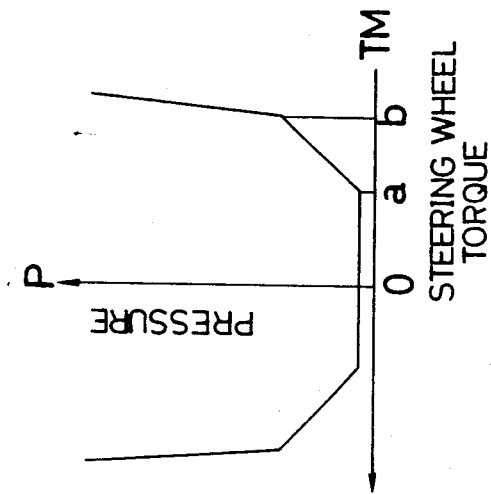
FIG. 6 is a diagram showing a steering pressure plotted against a steering wheel torque.

The rotary servovalve 20 thus constructed can therefore provide desired two-step valving characteristics (FIG. 6) for a power steering device, in which the steering wheel is not hydraulically power-assisted in the vicinity of the neutral position in which the steering wheel torque $T_M$ (angular displacement θ) is small, is gradually hydraulically power-assisted when the steering wheel torque $T_M$ exceeds a certain value, and is hydraulically power-assisted at a much greater rate as the steering wheel torque $T_M$ further increases.

While in the illustrated embodiment each chamfer is composed of an inclined surface, the chamfered surface may be varied to increase the degree of selectibility of two-step valving characteristics.

With the arrangement of the present invention, three types of chamfers are combined to provide two-step valving characteristics. Each of the chamfers may be of a simple shape and can be formed with ease, so that the servovalve can easily be manufactured. By selecting the angles of inclination of the chamfers as desired, various two-step valving characteristics can be selected in a wide range, and hence various steering characteristics can easily be achieved to meet different vehicle kinds and grades.

Although a certain preferred embodiment has been shown and described, it should be understood that many changes and modifications may be made therein without departing from the scope of the appended claims.

What is claimed is:

1. A rotary servovalve comprising:
   (a) a valve sleeve having a plurality of sleeve lands on an inner peripheral surface;
   (b) a rotor having a plurality of rotor lands on an outer peripheral surface and relatively rotatably fitted in said valve sleeve;
   (c) first and second fluid supply inlets opening into a space between said valve sleeve and said rotor;
   (d) a plurality of fluid discharge outlets opening in said space;
   (e) a pressure control section composed of selected ones of said sleeve lands and said rotor lands, said selected sleeve and rotor lands being angularly spaceable from each other when the rotary servovalve is in a neutral condition to allow communication between said first fluid supply inlet and at least a first one of said fluid discharge outlets;
   (f) a pressure characteristic adjusting section composed of other selected ones of said sleeve lands and said rotor lands, said other selected sleeve and rotor lands being positionable in overlapping relation to each other when the rotary servovalve is in the neutral condition to prevent communication between said second fluid supply inlet and said at least a first one of said fluid discharge outlets;
   (g) first chamfers formed on at least one of the sleeve and rotor lands constituting said pressure control section, said first chamfers comprising means for gradually reducing the area of communication between said first fluid supply inlet and said first one of said fluid discharge outlets when said valve sleeve and said rotor are relatively rotated;
   (h) second chamfers formed on at least one of the sleeve and rotor lands constituting said pressure characteristic adjusting section, said second chamfers comprising means for gradually increasing the area of communication between said second fluid supply inlet and said first one of said fluid discharge outlets when said valve sleeve and said rotor are relatively rotated; and
   (i) third chamfers formed on at least one of the sleeve and rotor lands constituting said pressure characteristic adjusting section, said third chamfers comprising means for gradually reducing the area of communication between said second fluid supply inlet and said first one of said fluid discharge outlets, with a delay from the action of said second chamfers, when said valve sleeve and said rotor are relatively rotated.

2. A rotary servovalve according to claim 1, wherein said second chamfers are narrower than said first chamfers, but wider than said third chamfers in the direction of rotation of said rotor.

3. A rotary servovalve according to claim 2, wherein said first chamfers have a width equal to the sum of widths of said second and third chamfers in the direction of rotation of said rotor.

4. A rotary servovalve according to claim 2, wherein said pressure control section and said pressure characteristic adjusting section are disposed contiguously in the direction of rotation of said rotor.

5. A rotary servovalve according to claim 2, including another pressure control section having the same construction as that of said pressure control section and disposed in diametrically opposite relation thereto across said rotor, and another pressure characteristic adjusting section having the same construction as that of said pressure characteristic adjusting section and disposed in diametrically opposite relation thereto across said rotor.

6. A rotary servovalve according to claim 5, wherein each of said pressure control sections comprises:
   (a) three sleeve lands;
   (b) said first fluid supply inlet opening at a top surface of the sleeve land located centrally in the direction of rotation of said sleeve lands;
   (c) a first rotor land angularly spaced from said central sleeve land and one of the two other sleeve lands disposed one on each side thereof when the rotary servovalve is in the neutral condition;
   (d) a second rotor land angularly spaced from said central sleeve land and the other one of the two other sleeve lands disposed one on each side thereof when the rotary servovalve is in the neutral condition;
   (e) two fluid discharge outlets opening on opposite sides of said first and second rotor lands in the direction of rotation thereof; and
   (f) said first chamfers formed on edges of said first and second rotor lands in the direction of rotation thereof.

7. A rotary servovalve according to claim 6, wherein each of said pressure characteristic adjusting sections comprises:
(a) three sleeve lands;
(b) said second fluid supply inlet opening at a top surface of the sleeve land located centrally in the direction of rotation of said sleeve lands;
(c) third and fourth rotor lands disposed in overlapping relation to said central sleeve land when the rotary servovalve is in the neutral condition;
(d) two fluid discharge outlets opening on outer sides of said third and fourth rotor lands in the direction of rotation thereof;
(e) said second chamfers formed on inner edges of said third and fourth rotor lands in the direction of rotation thereof; and
(f) said third chamfers formed on outer edges of said third and fourth rotor lands in the direction of rotation thereof.

8. A rotary servovalve according to claim 7, wherein each of the two sleeve lands one on each side of the central sleeve land in each said pressure control section and one of the sleeve lands one on each side of the central sleeve land in an adjacent one of the pressure characteristic adjusting sections are composed of a single sleeve land, and each of the two fluid discharge outlets in each said pressure control section and one of the two fluid discharge outlets in an adjacent one of the pressure characteristic adjusting sections are composed of a single fluid discharge outlet.

* * * * *